April 21, 1964     H. H. GOULD ETAL     3,129,755
TEMPERATURE GRADIENT ATTENUATING DEVICE
Filed May 2, 1960

INVENTORS
HERBERT H. GOULD
NORMAN F. TODA
BY
ATTORNEY

3,129,755
TEMPERATURE GRADIENT ATTENUATING DEVICE
Herbert H. Gould, Great Neck, and Norman F. Toda, Westbury, N.Y., assignors to Sperry Rand Corporation, Great Neck, N.Y., a corporation of Delaware
Filed May 2, 1960, Ser. No. 26,029
7 Claims. (Cl. 165—89)

This invention relates to a device for attenuating temperature gradients within an enclosure. The invention is particularly applicable to attenuating thermal gradients appearing within a fluid use for floating the sensitive element of an inertial device, such as, a gyroscope or accelerometer.

Many high performance, precise, inertial devices used for inertial guidance such as gyroscopes or accelerometers utilize a sensitive element enclosed in a sealed container and partially or fully floated by means of a fluid within the container. In devices of this type, a temperature differential or gradient existing within the fluid causes the fluid to flow by convection. This flow of fluid around the sensitive element causes a coercive torque to be applied to the sensitive element thereby resulting in an erroneous output from the device. Even a slight diametral temperature gradient for example one degree Fahrenheit causes a drift of approximately 0.2 degree per hour in a typical high performance floated gyro. This drift is undesirable and is minimized by the present invention.

The undesirable temperature gradients in the fluid are caused primarily by temperature gradients existing external to the inertial device since the heat sources and heat sinks within the device may be taken into consideration in the design of the device and symmetrically disposed to eliminate this condition. This is not so, however, with respect to external heat sources and heat sinks and it is primarily these external sources which cause the undesirable temperature gradients within the flotation fluid.

Prior art approaches to the solution of this problem include: (1) the use of alternate layers of thermal insulators and conductors comprising part of the outer casing of the inertial device to achieve both insulation and attenuation and (2) zone heating of portions of the inertial device utilizing segmented heaters and separate circuits associated therewith to achieve temperature uniformity of the fluid.

The prior art approaches, at best, achieve an attenuation limit of approximately 300 where the attenuation is defined as the ratio of the maximum difference or gradient of the temperature immediately external to the inertial device with respect to the maximum temperature difference existing in the fluid. Although attenuation of 300 is sufficient in certain applications, the low drift error and precision required in present day precision inertial guidance devices require attenuations substantially greater than 300. The present invention achieves attenuations considerably greater than 300 and can also control the degree of attenuation.

It is a primary object of the present invention to provide a device for attenuating temperature gradients within an enclosure.

It is a further object of the present invention to provide a device for attenuating temperature gradients within an enclosure in which the degree of attenuation may be controlled.

It is an additional object of the present invention to provide a device for attenuating temperature gradients within a fluid surrounding a sensitive element.

The above objects are obtained by a device for attenuating temperature gradients within an enclosure tending to be caused by temperature gradients external to said enclosure comprising heat absorbing and dissipating means disposed adjacent to and surrounding at least a portion of said enclosure for attenuating temperature gradients within at least the associated portion of said enclosure, and means for moving said heat absorbing and dissipating means relative to said enclosure for distributing the heat due to said external temperature gradients uniformly through said enclosure.

Further objects will appear from the following specification and claims when read in conjunction with the drawings in which:

Figures 1, 2, 3:
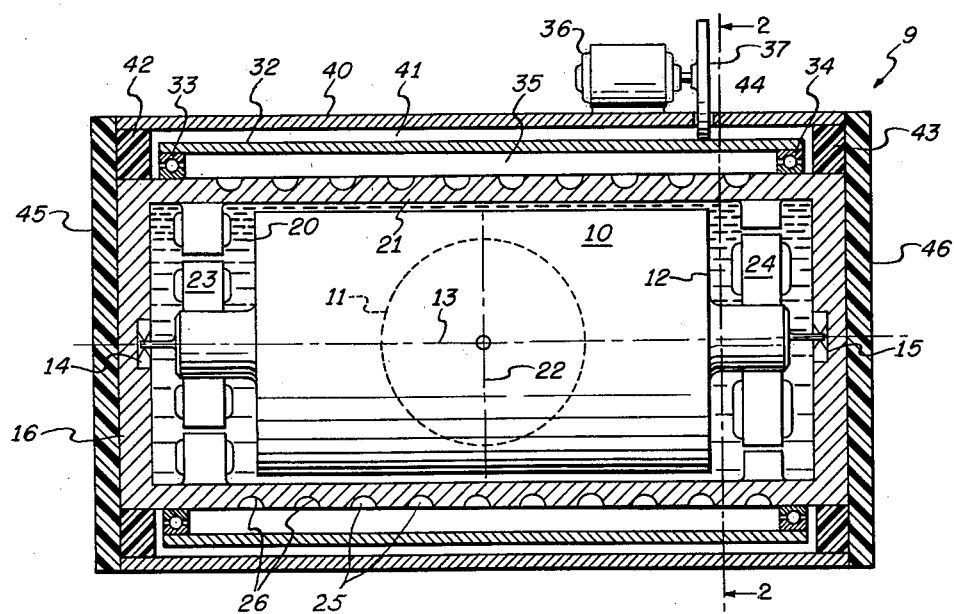
FIG. 1 is a vertical section on an enlarged scale of a gyroscope including the temperature gradient attenuation means of the present invention.
FIG. 2 is an end sectional view of the gyroscope of FIG. 1 taken along line 2—2 of FIG. 1 and including an externally disposed heat source and heat sink.
FIG. 3 is a graph showing the variation in the attenuation with rotational speed of the cylinder 32 of FIG. 1.

For purposes of example, the present invention will be applied to a gyroscope although it will be appreciated that it is equally applicable to maintaining uniform temperatures throughout enclosures generally.

Referring now to FIG. 1 the gyroscope 9 comprises a sensitive element 10 within which a gyro rotor 11 shown in dotted lines is hermetically sealed in a cylindrical float 12. The gyroscope 9 is a single-degree-of-freedom integrating gyro in which the sensitive element 10 is rotatable about its longitudinal or output axis 13 by means of spaced bearings 14 and 15. The gyro rotor 11 spins about a horizontal axis that is perpendicular to the axis 13. The sensitive element 10 is contained within a hollow cylindrical container or enclosure 16 upon which the spaced bearings 14 and 15 are mounted. The container 16 is coaxially disposed with respect to the longitudinal axis 13. The space within the container 16 between the sensitive element 10 and the inner surface of the container 16 is sealed with a flotation fluid 20 which surrounds and supports the sensitive element 10. The outer diameter of the cylindrical sensitive element 10 is slightly less than the inner diameter of the container 16 in order that a thin film 21 of flotation fluid 20 between the float cylinder 12 and the adjacent interior surface of the container 16 provides the integrating function due to the viscous shear effects of the fluid 20.

The purpose of the gyroscope 9 is to measure rotation about its input axis 22. When the gyroscope 9 is rotated about the axis 22, a gyroscopic torque is generated about its output axis 13 which in turn causes rotation of the floated sensitive element 10 about the axis 13 with respect to the container 16. The relative movement of the sensitive element 10 with respect to the container 16 is measured by means of a pick-off 23 which has its armature mounted on the left end of the sensitive element 10 for rotation therewith while its stator is mounted on the container 16. To superimpose command torques upon the gyroscopic torque, a permanent magnet torque generator 24 is mounted on the right end of the sensitive element 10. The pick-off 23 and the torque 24 are symmetrically disposed within the container 16 with respect to the axes 13 and 22 to provide symmetrical sources of heat as well as for mass balance purposes. The electrical power required to operate the pick-off 23, torque 24 and to spin the gyro rotor 11 is brought in through electrical leads in a conventional manner, not shown.

It will be appreciated that the integration resulting from the viscous shear effects is dependent upon the viscosity of the flotation fluid 20 which in turn varies with temperature. In addition, it will be appreciated that the buoyant force of the flotation fluid is dependent on the density which in turn varies with temperature. Since neutral buoyancy, i.e., exact equilibrium between the buoyant and gravity forces acting on the sensitive element is required to eliminate pivot friction, a close control of the density and hence average temperature of the flotation fluid is required. To maintain the proper density and viscosity of the fluid 20, thermal sensors and heaters 25 are wrapped around the outer surface of the container 16 by means of grooves 26 therein. Conventional means, not shown, may also be included to compensate for the contraction and expansion of the fluid 20 with temperature variations.

With the above arrangement, temperature gradients within the fluid 20 caused by heat sources or heat sinks within the container 16 are controlled by the symmetrical design and by the temperature sensors and heaters 25. However, in the absence of the present invention, temperature gradients external to the container 16 are not controlled and cause undesirable coercive torques on the sensitive element 10 as will be explained with reference to FIG. 2.

In FIG. 2, a heat source 30 is shown disposed to the left of the gyroscope 9 transmissing heat as indicated by the dotted arrows toward a point A within the fluid 20. A heat sink 31 is shown disposed to the right of the gyroscope 9 absorbing heat in the direction indicated by the dotted arrows from the point B in the fluid 20. The external temperature gradient caused by the heat source 30 and the heat sink 31 causes the fluid 20 at point A to become warmer and that at point B to become colder thereby resulting in a temperature gradient diametrically across the fluid 20 from point A to point B. The warmer fluid 20 at point A tends to rise in the direction indicated by its associated arrow while the fluid 20 at point B being colder tends to drop. The fluid 20 therefore tends to travel around the sensitive element 10 in a clockwise direction as indicated by the arrows. The viscous shear effect of the fluid rotating about the sensitive element 10 applies a coercive torque on the sensitive element 10 tending to rotate it around its output axis 13 thus introducing an undesirable error in the output signal measured by the pick-off 23.

To minimize this error, a temperature gradient attenuating means in the form of a rotatable hollow cylinder 32 is disposed intermediate the external temperature gradient caused by the heat source 30 and the heat sink 31 and the container 16. The cylinder 32 is disposed adjacent to and substantially surrounding the outer cylindrical surface of the container 16 and is mounted for rotation thereon about the axis 13 by means of spaced bearings 33 and 34 shown in FIG. 1. The outer diameter of the container 16 is slightly less than the inner diameter of the cylinder 32 thereby providing a small air gap 35 therebetween. The rotatable cylinder 32 is rotated about the axis 13 by motor 36 (shown in FIG. 1) that is mounted on an outer hollow cylindrical housing 40 which in turn is coaxially disposed with respect to the axis 13. The motor 36 drives the cylinder 32 by means of a friction wheel drive 37 that protrudes through an opening 44 in the housing 40 and contacts the outer surface of the cylinder 32 as shown more clearly in FIG. 2. The outer diameter of the cylinder 32 is slightly smaller than the inner diameter of the housing 40 to provide a small air gap 41 therebetween. The housing 40 is fixedly mounted on the container 16 by means of ring-shaped insulators 42 and 43. Each end of the container 16 is insulated by means of flat, circular insulators 45 and 46 respectively.

In operation, referring to FIG. 2, the motor 36 rotates the rotating cylinder 32 by means of the friction wheel drive 37 preferably at a constant speed. As the portion of the cylinder 32 adjacent to point A passes the heat source 30, that portion of the cylinder 32 becomes warmer by absorbing heat while the portion adjacent to point B becomes colder because of the heat sink 31. As the cylinder 32 continues to rotate, the portion that was adjacent to point A now becomes adjacent to point B tending to warm the fluid 20 at point B by dissipating heat while the portion previously adjacent to point B now becomes adjacent to point A tending to cool the fluid at point A. Further, with the cylinder 32 being constructed of a heat conductive material, such as stainless steel, the temperatures tend to equalize within the cylinder 32 by conduction. Thus, the effect of the rotation of the cylinder 32 and the conduction therethrough tends to equalize the temperatures at points A and B as well as throughout the fluid 20, particularly in a circumferential direction, thus attenuating the diametral temperature gradients within the fluid 20 and consequently minimizing the undesirable coercive torques on the sensitive element 10 which would otherwise result in an erroneous output signal.

To attenuate the temperature gradients within the container 16, the cylinder 32 is preferably rotated at a constant speed. The rotational speed of the cylinder 32 determines the degree of attenuation of the temperature gradients. This is graphically shown on the basis of calculated data in the graph of FIG. 3 which plots attenuation versus rotational speed in r.p.m. of the cylinder 32 for a stainless steel cylinder rotating in air. From viewing this graph, it will be appreciated that the prior art attenuation of 300 can be appreciably improved by the application of the present invention. It will also be appreciated that varying the speed of rotation will vary the amount of attenuation and thus the attenuation may be controlled in accordance with the rotational speed of the cylinder 32.

The air gaps 35 and 41 are preferably kept relatively small since convection through the air gaps is not considered beneficial. The dimensions of the air gaps 35 and 41 are determined primarily by the maximum ambient temperature and the amount of internally generated heat as well as the required flotation fluid temperature. An air gap thickness of .015 inch using a stainless steel cylinder 32 having a thickness of .030 inch and rotated at a constant speed between 6 and 250 r.p.m. has been satisfactory using a typical flotation fluid. The thermal sensors and heaters 25 have a negligible effect upon the attenuation of thermal gradients within the container 16 caused by temperature gradients external thereto.

In the embodiment shown in FIGS. 1 and 2, the temperature gradient attenuating means is disclosed as a hollow cylinder 32 which encloses only a portion of the enclosure or container 16. This embodiment of the invention provides primarily temperature gradient attenuation across the diameter defined by points A and B since the temperature difference existing across this diameter results in undesirable coercive torques around the output axis 13. For purposes of diametral temperature gradient attenuation as explained above, this arrangement proves to be entirely satisfactory. However, if temperature gradient attenuation is also desired in an axial direction parallel to the axis 13 as well as in a direction radial to the axis 13, the cylinder 32 may be extended to substantially entirely enclose the container 16.

A typical example where it would be desirable to have the temperature gradient attenuating means substantially surrounding an enclosure is in a floated two-degree-of-freedom gyro supported within a container such as 16 that is spherical instead of cylindrical. In this case, the temperature gradient attenuating means would also be spherical in lieu of cylindrical as shown at 32.

While the invention has been applied for purposes of example to a gyroscope it is equally adaptable to other inertial devices such as accelerometers particularly those having floated sensitive elements. It is also adaptable to attenuating temperature gradients within many types of enclosures where it is desired to maintain a uniform temperature therein.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a device having a sensitive element, containing means for enclosing said sensitive element, a fluid contained within said containing means and surrounding said sensitive element whereby diametral temperature gradients within said fluid, if present, cause said fluid to undesirably coerce said sensitive element, heat absorbing and dissipating means adjacent to and surrounding at least a portion of said containing means for maintaining a uniform diametral temperature within at least said portion of the containing means in spite of temperature gradients external to said containing means, and means for moving said heat absorbing and dissipating means relative to said containing means and said external temperature gradients for maintaining a uniform diametral temperature within said containing means.

2. In a device as claimed in claim 1 including means for controlling the movement of said heat absorbing and dissipating means for controlling the degree of attenuation in accordance with said movement.

3. In combination, a device having a sensitive element mounted for movement about at least one axis thereof, containing means for enclosing said sensitive element, a fluid contained within said containing means and surrounding said sensitive element whereby diametral temperature gradients within said fluid, if present, cause said fluid to undesirably coerce said sensitive element, temperature gradient attenuating means adjacent to and surrounding a portion of said containing means for maintaining a substantially uniform diametral temperature within said portion of the containing means in spite of temperature gradients external to said containing means, and means for moving said temperature gradient attenuating means at a velocity relative to said containing means and said external temperature gradients to minimize the diametral temperature gradient within said portion of the containing means.

4. In combination, an inertial device having a sensitive element mounted for movement about at least one axis thereof, containing means for enclosing said sensitive element, a fluid contained within said containing means and surrounding said sensitive element whereby diametral temperature gradients within said fluid, if present, cause said fluid to apply undesirable coercive torques to the sensitive element, temperature gradient attenuating means adjacent to and surrounding at least a portion of said containing means for minimizing diametral temperature gradients within said containing means in spite of temperature gradients external to said containing means, and means for rotating said temperature gradient attenuating means relative to said containing means and said external temperature gradients to minimize the diametral temperature gradient within at least said portion of the containing means.

5. In combination, an inertial device having a sensitive element mounted for movement about at least one axis thereof, cylindrical containing means for enclosing said sensitive element, said containing means having a longitudinal axis, a fluid contained within said containing means and surrounding said sensitive element whereby diametral temperature gradients within said fluid, if present, cause said fluid to undesirably coerce said sensitive element, a heat conductive hollow, cylindrical member coaxially disposed with respect to said longitudinal axis and surrounding at least a portion of said containing means for minimizing diametral temperature gradients within at least said portion of the containing means tending to be caused by temperature gradients external to said containing means, said cylindrical member being mounted for rotation relative to said containing means about said longitudinal axis, and means for rotating said cylindrical member relative to said external temperature gradients to minimize the diametral temperature gradient within at least said portion of the containing means.

6. In the combination claimed in claim 5 including means for controlling the rotational speed of said cylindrical member for controlling the degree of attenuation within said containing means.

7. In combination, an inertial device having a sensitive floated element mounted for movement about at least one axis thereof, a hollow, cylindrical containing means for enclosing said sensitive element, said containing means having a longitudinal axis, a fluid contained within said containing means surrounding and at least partially supporting said sensitive element, whereby diametral temperature gradients within said fluid, if present, cause said fluid to undesirably coerce said sensitive element, a heat-conductive, hollow cylindrical member coaxially disposed with respect to said longitudinal axis and surrounding at least a portion of said containing means for minimizing temperature gradients in a diametral direction within at least said portion of the containing means, said diametral temperature gradients tending to be caused by temperature gradients external to said containing means, said cylindrical member being mounted for rotation relative to said containing means about said longitudinal axis for distributing heat uniformly through said containing means in a diametral direction, and means for rotating said cylindrical means relative to said external temperature gradient to minimize the diametral gradient within at least said portion of the containing means.

References Cited in the file of this patent

UNITED STATES PATENTS

| | | |
|---|---|---|
| 1,672,036 | Oltman | June 5, 1928 |
| 2,840,366 | Wing | June 24, 1958 |